United States Patent [19]

Takahashi et al.

[11] Patent Number: 4,653,874
[45] Date of Patent: Mar. 31, 1987

[54] ZOOM LENS

[75] Inventors: Sadatoshi Takahashi, Tokyo; Toshiaki Asano, Kanagawa; Sadahiko Tsuji, Kanagawa; Kazuo Fujibayashi, Kanagawa; Masatake Kato, Tokyo, all of Japan

[73] Assignee: Canon Kabushiki Kaisha, Japan

[21] Appl. No.: 879,825

[22] Filed: Jun. 26, 1986

Related U.S. Application Data

[63] Continuation of Ser. No. 511,674, Jul. 7, 1983, abandoned.

[30] Foreign Application Priority Data

Jul. 14, 1982 [JP]  Japan ........................ 57-123606

[51] Int. Cl.$^4$ ............................................. G02B 15/16
[52] U.S. Cl. .................................... 350/427; 350/423
[58] Field of Search ............... 350/427, 423, 432, 457, 350/458, 475

[56] References Cited

U.S. PATENT DOCUMENTS

2,433,438 12/1947 Cox ........................................ 350/457
3,604,786  9/1971 Baker ..................................... 350/432
3,796,481  3/1974 Fujii ....................................... 350/427

Primary Examiner—John K. Corbin
Assistant Examiner—P. M. Dzierzynski
Attorney, Agent, or Firm—Toren, McGeady and Goldberg

[57] ABSTRACT

A zoom lens having at least three components, or, from front to rear, a first component of positive power, a second component of negative power and a third component with the air separations between the successive two of said three components being varied to effect zooming, whereby said first component is constructed with, from front to rear, a bi-convex first lens, a second lens of negative power and a third lens of positive power.

10 Claims, 30 Drawing Figures

SPHERICAL ABERRATION

FIG.4-2

ASTIGMATISM

FIG.4-3

DISTORTION(%)

FIG.4-4

SPHERICAL ABERRATION

FIG.4-5

ASTIGMATISM

FIG.4-6

DISTORTION(%)

FIG.4-7

SPHERICAL ABERRATION

FIG.4-8

ASTIGMATISM

FIG.4-9

DISTORTION(%)

ZOOM LENS

This is a continuation of application Ser. No. 511,674, filed July 7, 1983 now abandoned.

BACKGROUND OF THE INVENTION

1. Field of the Invention

This invention relates to zoom lenses suited for still cameras, cine-cameras and video cameras, and more particularly to zoom lenses of a high relative aperture and a large zoom ratio while still permitting good stability of aberration correction throughout the entire focusing range.

2. Description of the Prior Art

In many conventional zoom lenses, the front or first lens component has been constructed from three lenses of negative, positive and positive powers in this order from front, or from a doublet of lenses of negative and positive powers and a single of positive power.

And the first component has been made either to move as a member of the zoom section during zooming, or to remain stationary during zooming as it is exclusively devoted to focusing, for zooming is performed by second and third components arranged in rear of the first component.

The use of such construction and arrangement of the elements of the first component in the zoom lens design has generally resulted in a tendency that as the object distance changes, aberrations varies to large extent, particularly the ranges of variation of spherical aberration and astigmatism being increased when zoomed to telephoto positions.

Another tendency was that the diameter of the first component becomes relatively large, causing the weight of the complete zoom lens to increase, and prejudicing the manageability. For this reason, it has been proposed in Japanese Laid-Open Patent Publication No. Sho 57-53718 that some of the elements of the first component are made up of plastic material with an advantage of decreasing the weight of the first component.

However, upon consideration of the removal of an influence of change of the ambient temperature, two plastic lenses of opposite power must be employed. Because of the distribution of the negative, positive and positive powers over the first component, the frontmost or negative first lens must be of plastic material. Since this plastic lens is exposed to the open air, its front surface is liable to be scratched and also to be tarnished yellow. These constitute a serious problem.

As the conventional lens system having the first component constructed with three lenses, mention may be made of those disclosed in U.S. Pat. Nos. 2,843,016, 2,937,572 and 2,746,350 and Re 29237. As for a distribution of positive, negative, positive and positive powers, there is U.S. Pat. No. 4,113,356.

SUMMARY OF THE INVENTION

It is an object of the present invention to provide a zoom lens of a high relative aperture and a large zoom ratio with good stability of aberration correction not only throughout the zooming range but also throughout the focusing range.

Another object of the present invention is to provide a zoom lens of good manageability due to a decrease in the weight of the first component thereof.

To achieve the objects of the present invention, a feature of the construction and arrangement and form of the elements of the zoom lens is that the lens system has as at least three lens groups, or, from front to rear, a first lens group of positive refractive power, a second lens group of negative refractive power and a third lens group with the air separations between the successive two of the three lens groups made variable to effect zooming, and the first lens group is made constructed with, from front to rear, a bi-convex first lens, a second lens of negative refractive power, and a third lens of positive refractive power.

BRIEF DESCRIPTION OF THE DRAWINGS

FIGS. 2-1 through -9, 4-1 through -9 and 6-1 through -9 are graphic representations of the various aberrations of the lenses of FIGS. 1, 3 and 5 respectively.

DETAILED DESCRIPTION OF THE PREFERRED EMBODIMENTS

Figure 1:
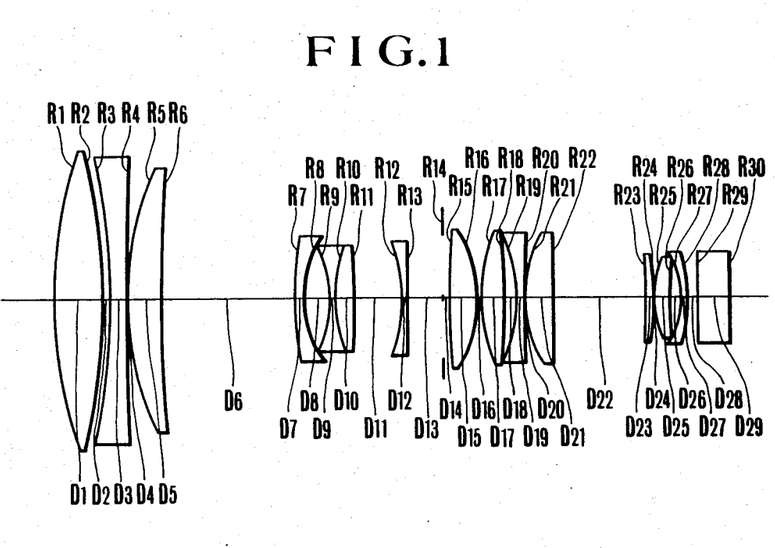
FIGS. 1, 3 and 5 are lens block diagrams of embodiments 1, 2 and 3 of the present invention respectively.
Figure 3:
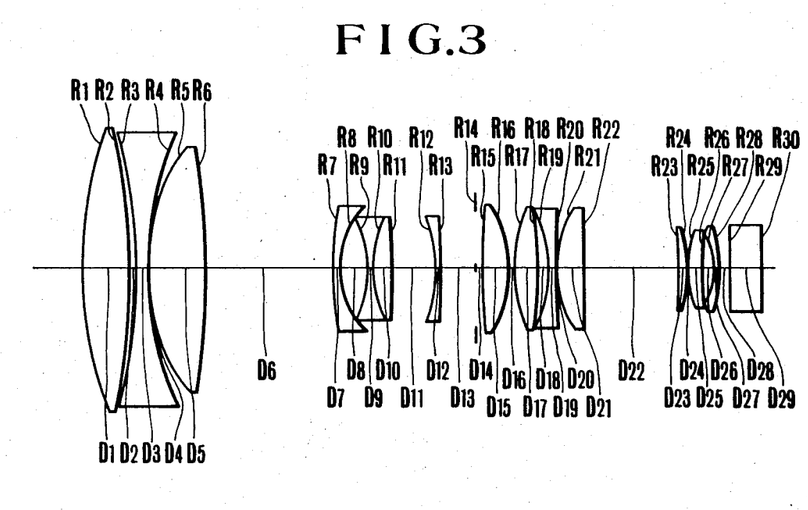
Figure 5:
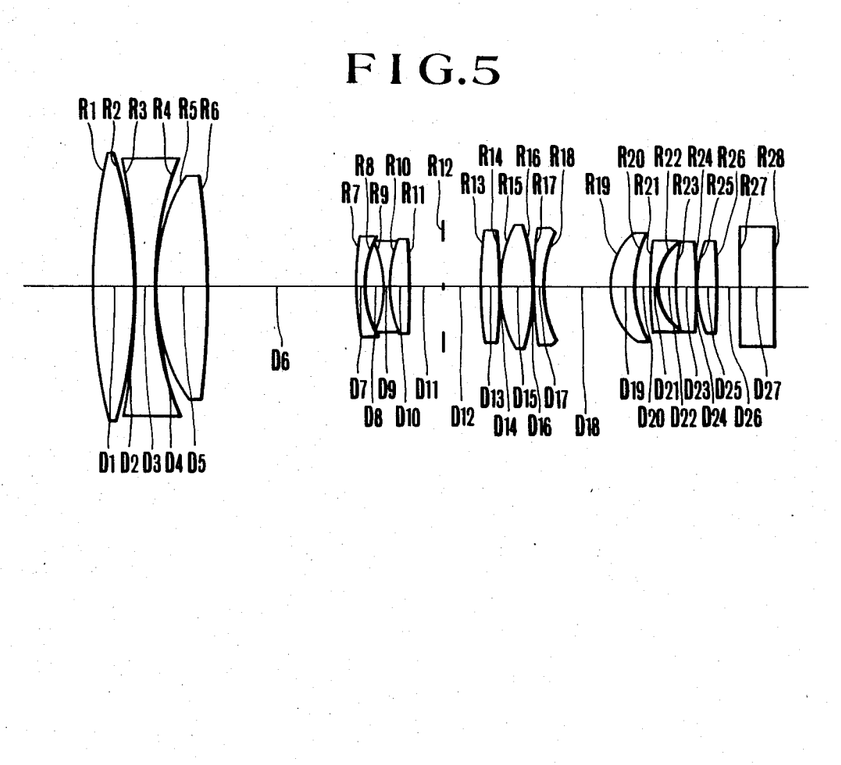
Figure 21:
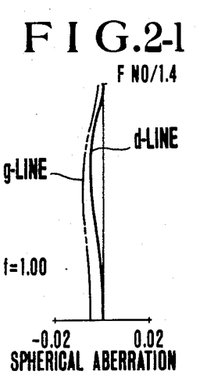
Figure 22:
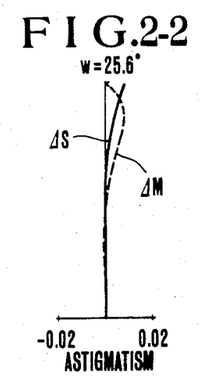
Figure 23:
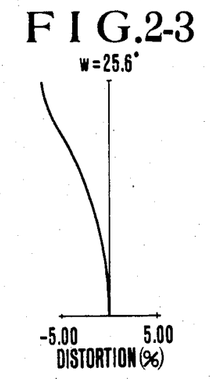
Figure 24:
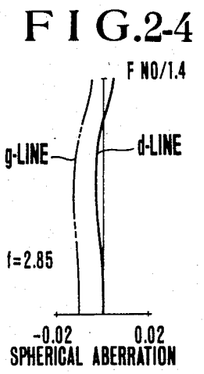
Figure 25:
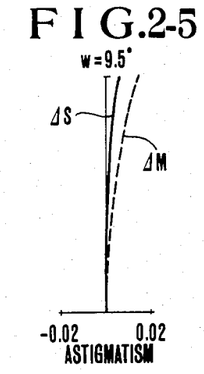
Figure 26:
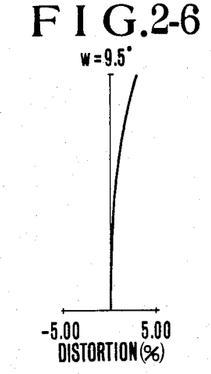
Figure 27:
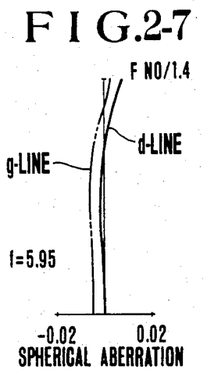
Figure 28:
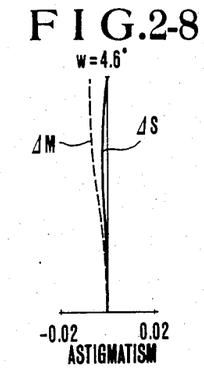
Figure 29:
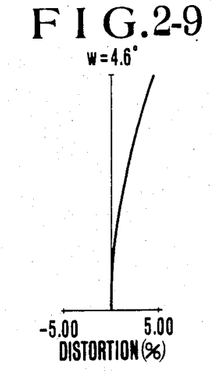
Figure 41:
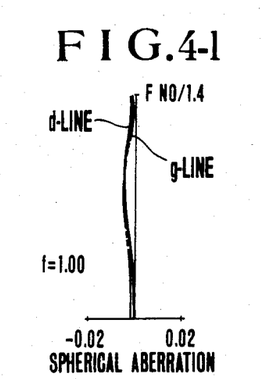
Figure 42:
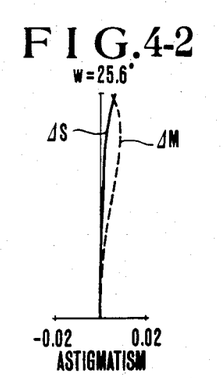
Figure 43:
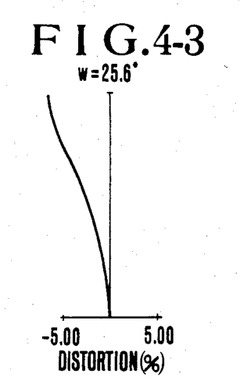
Figure 44:
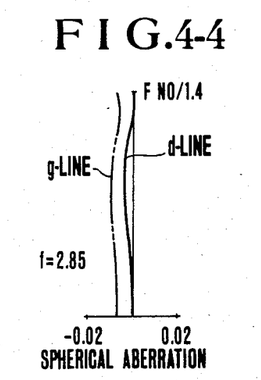
Figure 45:
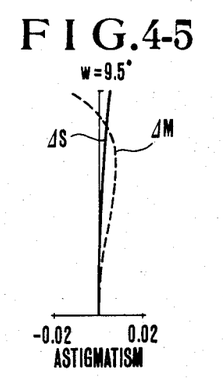
Figure 46:
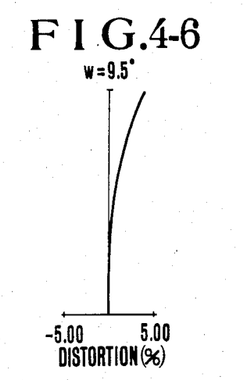
Figure 47:
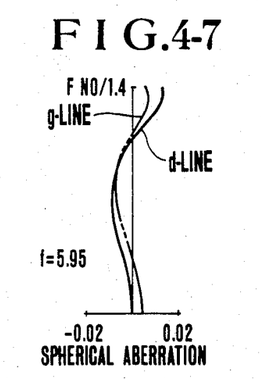
Figure 48:
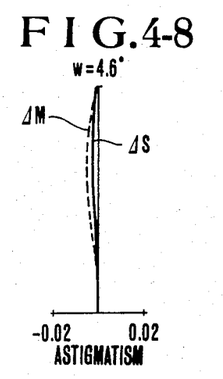
Figure 49:
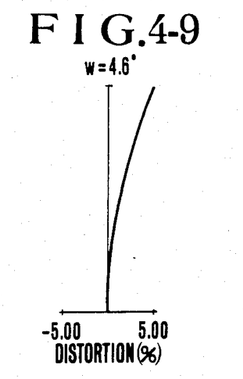
Figure 61:
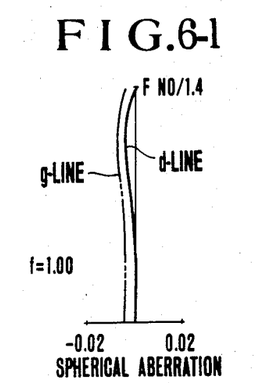
Figure 62:
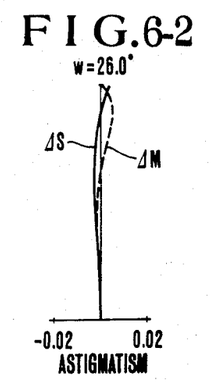
Figure 63:
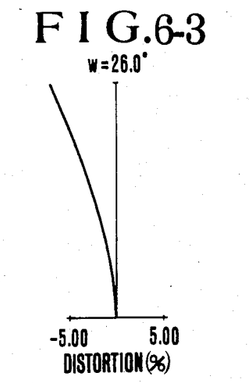
Figure 64:
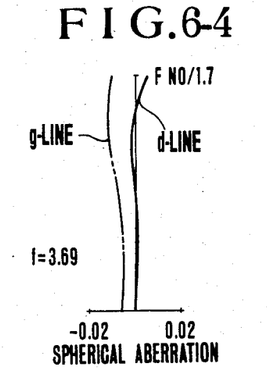
Figure 65:
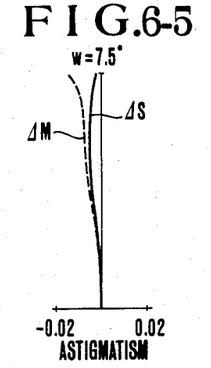
Figure 66:
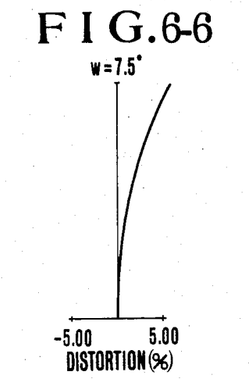
Figure 67:
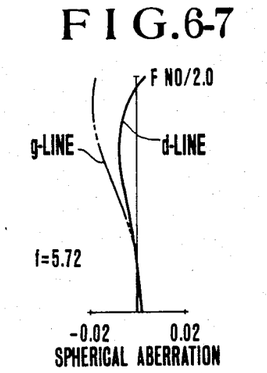
Figure 68:
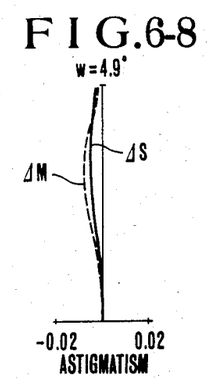
Figure 69:
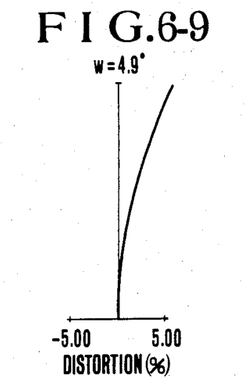

As in the present invention, by constructing the first lens group with three members in the form of, from front to rear, a first lens with both of its surfaces being convex, a second lens of negative refractive power and a third lens of positive refractive power, and by employing the zoom type that the first lens group is made to move during zooming, or the separation between the first and second lens groups is made to move during zooming, it is made possible to reduce the range of variation with focusing of aberrations while still maintaining good stability of aberration correction throughout the zooming range. Particularly by arranging the positive first and the negative second lenses in a broken contact, as the air lens created there-between is given an appropriate refractive power, it is made possible to achieve a good compromise between the requirements that variation of aberrations for variation of the object distance is as far lessened as possible, and that good correction of aberrations is maintained throughout the entire zooming range.

Further, in the present invention, to facilitate an improvement of the present state of aberration correction, it is preferred to satisfy the following conditions:

That is, letting F1 denote the overall focal length of the first lens group, and f1, f2 and f3 the focal lengths of the first, second and third lenses respectively, $\nu 1$, $\nu 2$ and $\nu 3$ the Abbe numbers of the media of the first, second and third lenses respectively, and Ri the radius of curvature of the i-th lens surface counting from front in the first lens group, $$0.5f3 < f1 < 2f3 \tag{1}$$

$$\left| \frac{1}{f1\nu 1} + \frac{1}{f2\nu 2} + \frac{1}{f3\nu 3} \right| < 0.01 \tag{2}$$

$$F1 < |R2| \tag{3}$$

$$0.8|R2| < |R3| < 1.5|R2| \tag{4}$$

are satisfied.

Inequalities of condition (1) represent a proper range of refractive power of the first lens in terms of that of the third lens, and are set forth to as far reduce the residual aberrations of the first lens group as possible.

When the lower limit of the inequalities of condition (1) is exceeded, the refractive power of the first lens becomes too large to stabilize the aberrations throughout the zooming and focusing ranges. When the upper limit is exceeded, as the refractive power of the first lens weakens, the third lens must be given a larger duty of refractive power, thereby the spherical aberration is objectionably increased.

Inequality of condition (2) is to well correct the first lens group for chromatic aberrations in itself. When the condition (2) is violated, particularly the longitudinal chromatic aberration becomes difficult to correct. Inequality of condition (3) is to well correct for image aberrations for the maximum image angle in the shortest focal length positions.

The first lens is, upon consideration of good correction for distortion in the wide angle positions, desired to take the bi-convex form, wherein the radius of curvature, R2, of the rear surface of the first lens is made larger than the focal length of the first lens group, whereby higher-order aberrations are reduced, and the distortion is well corrected.

When condition (3) is violated, the distortion is objectionably increased in the wide angle positions.

Inequalities of condition (4) represent a proper range of radii of curvature of the front surface of the second lens in terms of the radius of curvature of the rear surface of the first lens, by which the aberrations and particularly spherical aberration and astigmatism are well corrected.

When the lower limit of condition (4) is exceeded, insufficient correction of distortion for the wide angle positions results. When the upper limit is exceeded, insufficient correction of spherical aberration for the telephoto positions results.

Further, in the present invention, in order to reduce the weight of the zoom lens as a whole, it is preferred to use plastic in making up the third lens, while the first lens is made up of optical glass.

Also, to compensate for a change of the refractive index of the plastic material due to the change of the ambient temperature, it is preferred to use plastic material in making up the second lens.

And, to allow for the great increases in the relative aperture and zoom ratio of the lens system to be effectively achieved by minimizing the residual aberrations of the first lens group, it is preferred to make at least one of the lens surfaces in the first lens group aspherical. In this connection, it should be pointed out that particularly when the aspheric surface is formed by the plastic material, aspherical lenses of the desired shape with the prescribed tolerances of the figuring parameters can be economically manufactured.

It is to be noted that in the embodiments of the invention, the zoom lens is constructed with four lens groups, and the focusing provision is made at the first lens group. But, focusing may be otherwise performed by moving all the four lens groups, or by moving another part of the lens system.

With the entire system consisting of three lens groups, however, it is preferred to move the first lens group for focusing.

Next, specific numerical examples of the invention are shown. In the specific numerical examples, Ri is the radius of curvature of the i-th lens surface counting from front, Di the i-th lens thickness or air separation counting from front, and Ni and $\nu i$ the refractive index and Abbe number of the glass of the i-th lens element counting from front respectively.

The aspherical surface is figured by an equation for the amount of deviation from a spherical surface having radius of curvature, R, equal to that of the paraxial region of the aspherical surface, in the optical axis taken as an x-axis at a height, h, in a y-axis taken in a direction perpendicular to the x-axis and passing through the vertex of the aspherical surface, expressed as:

$$x = R\left(1 - \sqrt{1 - \left(\frac{h}{R}\right)^2}\right) + Bh^4 + Ch^6 + Dh^8$$

where B, C and D are aspheric coefficients.

NUMERICAL EXAMPLE 1

| F = 1.00–5.95 | FNO = 1:1.4 | $2\omega$ = 51.1°–9.2° | |
|---|---|---|---|
| R1 = 6.818 | D1 = 0.74 | N1 = 1.69680 | $\nu1$ = 55.5 |
| R2 = −10.748 | D2 = 0.13 | | |
| R3 = −9.585 | D3 = 0.26 | N2 = 1.84666 | $\nu2$ = 23.9 |
| R4 = 70.157 | D4 = 0.01 | | |
| R5 = 4.587 | D5 = 0.52 | N3 = 1.60311 | $\nu3$ = 60.7 |
| R6 = 30.982 | D6 = Variable | | |
| R7 = 5.469 | D7 = 0.10 | N4 = 1.77250 | $\nu4$ = 49.6 |
| R8 = 1.455 | D8 = 0.43 | | |
| R9 = −1.686 | D9 = 0.09 | N5 = 1.69680 | $\nu5$ = 55.5 |
| R10 = 2.542 | D10 = 0.27 | N6 = 1.84666 | $\nu6$ = 23.9 |
| R11 = −23.551 | D11 = Variable | | |
| R12 = −2.373 | D12 = 0.09 | N7 = 1.69680 | $\nu7$ = 55.5 |
| R13 = −33.501 | D13 = Variable | | |
| R14 = Stop | D14 = 0.09 | | |
| R15 = 9.230 | D15 = 0.44 | N8 = 1.63854 | $\nu8$ = 55.4 |
| R16 = −1.961 | D16 = 0.09 | | |
| R17 = 2.774 | D17 = 0.35 | N9 = 1.60311 | $\nu9$ = 60.7 |
| R18 = −7.043 | D18 = 0.18 | | |
| R19 = −2.216 | D19 = 0.11 | N10 = 1.75520 | $\nu10$ = 27.5 |
| R20 = 16.712 | D20 = 0.01 | | |
| R21 = 1.872 | D21 = 0.43 | N11 = 1.60311 | $\nu11$ = 60.7 |
| R22 = −46.772 | D22 = 1.47 | | |
| R23 = −29.353 | D23 = 0.13 | N12 = 1.51633 | $\nu12$ = 64.1 |
| R24 = −3.739 | D24 = 0.01 | | |
| R25 = 1.791 | D25 = 0.24 | N13 = 1.60311 | $\nu13$ = 60.7 |
| R26 = 14.077 | D26 = 0.17 | | |
| R27 = −1.175 | D27 = 0.09 | N14 = 1.80518 | $\nu14$ = 25.4 |
| R28 = −2.544 | D28 = 0.17 | | |
| R29 = Stop | D29 = 0.52 | N15 = 1.51633 | $\nu15$ = 64.1 |
| R30 = Stop | | | |

| Variable | Focal Length | | |
|---|---|---|---|
| Separation | 1.00 | 2.85 | 5.95 |
| D6 | 0.145 | 2.013 | 2.812 |
| D11 | 2.877 | 0.740 | 0.256 |
| D13 | 0.296 | 0.564 | 0.249 |

| f1 = 6.09 | |
| f2 = −9.95 | F1 = 5.72 |
| f3 = 8.86 | |

NUMERICAL EXAMPLE 2

| F = 1.00–5.95 | FNO = 1:1.4 | $2\omega$ = 51.1°–9.2° | |
|---|---|---|---|
| R1 = 7.687 | D1 = 0.74 | N1 = 1.69680 | $\nu1$ = 55.5 |
| R2 = −10.650 | D2 = 0.09 | | |
| R3 = −9.538 | D3 = 0.17 | N2 = 1.58349 | $\nu2$ = 29.8 |
| R4 = 5.224 | D4 = 0.01 | | |
| R5 = 3.070 | D5 = 0.91 | N3 = 1.49171 | $\nu3$ = 57.4 |
| R6 = −12.312 | D6 = Variable | | |
| R7 = 5.820 | D7 = 0.10 | N4 = 1.77250 | $\nu4$ = 49.6 |
| R8 = 1.439 | D8 = 0.45 | | |
| R9 = −1.716 | D9 = 0.09 | N5 = 1.69680 | $\nu5$ = 55.5 |
| R10 = 2.132 | D10 = 0.27 | N6 = 1.84666 | $\nu6$ = 23.9 |
| R11 = −25.150 | D11 = Variable | | |
| R12 = −2.187 | D12 = 0.09 | N7 = 1.69680 | $\nu7$ = 55.5 |

-continued

| | | | |
|---|---|---|---|
| R13 = −15.366 | D13 = Variable | | |
| R14 = Stop | D14 = 0.09 | | |
| R15 = 9.432 | D15 = 0.44 | N8 = 1.63854 | ν8 = 55.4 |
| R16 = −1.970 | D16 = 0.09 | | |
| R17 = 2.777 | D17 = 0.35 | N9 = 1.60311 | ν9 = 60.7 |
| R18 = −8.218 | D18 = 0.18 | | |
| R19 = −2.171 | D19 = 0.11 | N10 = 1.75520 | ν10 = 27.5 |
| R20 = 15.171 | D20 = 0.01 | | |
| R21 = 1.860 | D21 = 0.43 | N11 = 1.60311 | ν11 = 60.7 |
| R22 = −47.885 | D22 = 1.47 | | |
| R23 = −28.974 | D23 = 0.13 | N12 = 1.51633 | ν12 = 64.1 |
| R24 = −3.661 | D24 = 0.01 | | |
| R25 = 1.731 | D25 = 0.24 | N13 = 1.60311 | ν13 = 60.7 |
| R26 = 17.427 | D26 = 0.17 | | |
| R27 = −1.219 | D27 = 0.09 | N14 = 1.80518 | ν14 = 25.4 |
| R28 = −2.446 | D28 = 0.17 | | |
| R29 = Stop | D29 = 0.52 | N15 = 1.51633 | ν15 = 64.1 |
| R30 = Stop | | | |

| Variable Separation | Focal Length | | |
|---|---|---|---|
| | 1.00 | 2.85 | 5.95 |
| D6 | 0.098 | 1.967 | 2.765 |
| D11 | 2.863 | 0.726 | 0.242 |
| D14 | 0.296 | 0.564 | 0.249 |

| Surface No. | Aspheric Coefficient | | |
|---|---|---|---|
| | B | C | D |
| 5 | −0.2953 × 10⁻² | −0.3669 × 10⁻³ | −0.1963 × 10⁻⁴ | f1 = 6.52
f2 = −5.76          F1 = 5.72
f3 = 5.10

In this embodiment, the second and third lenses are made of plastic material.

NUMERICAL EXAMPLE 3

F = 1.00–5.72   FNO = 1:1.4–2.0   2ω = 51.9°–9.7°

| | | | |
|---|---|---|---|
| R1 = 8.178 | D1 = 0.66 | N1 = 1.60311 | ν1 = 60.7 |
| R2 = −7.584 | D2 = 0.03 | | |
| R3 = −9.307 | D3 = 0.27 | N2 = 1.58349 | ν2 = 29.8 |
| R4 = 5.377 | D4 = 0.03 | | |
| R5 = 3.125 | D5 = 0.78 | N3 = 1.49171 | ν3 = 57.4 |
| R6 = −14.861 | D6 = Variable | | |
| R7 = 7.882 | D7 = 0.11 | N4 = 1.77250 | ν4 = 49.6 |
| R8 = 1.540 | D8 = 0.31 | | |
| R9 = −1.642 | D9 = 0.09 | N5 = 1.69680 | ν5 = 55.5 |
| R10 = 2.137 | D10 = 0.28 | N6 = 1.84665 | ν6 = 23.9 |
| R11 = −19.496 | D11 = Variable | | |
| R12 = Stop | D12 = Variable | | |
| R13 = 5.775 | D13 = 0.28 | N7 = 1.49171 | ν7 = 57.4 |
| R14 = −7.014 | D14 = 0.01 | | |
| R15 = 2.005 | D15 = 0.51 | N8 = 1.60311 | ν8 = 60.7 |
| R16 = −3.179 | D16 = 0.01 | | |
| R17 = 9.057 | D17 = 0.13 | N9 = 1.58349 | ν9 = 29.8 |
| R18 = 1.992 | D18 = Variable | | |
| R19 = 1.055 | D19 = 0.38 | N10 = 1.62299 | ν10 = 58.2 |
| R20 = 1.778 | D20 = 0.24 | | |
| R21 = 3.988 | D21 = 0.12 | N11 = 1.84665 | ν11 = 23.9 |
| R22 = 0.882 | D22 = 0.27 | | |
| R23 = 3.742 | D23 = 0.32 | N12 = 1.60311 | ν12 = 60.7 |
| R24 = −15.322 | D24 = 0.01 | | |
| R25 = 1.735 | D25 = 0.31 | N13 = 1.77250 | ν13 = 49.6 |
| R26 = −10.003 | D26 = 0.35 | | |
| R27 = Stop | D27 = 0.53 | N14 = 1.51633 | ν14 = 64.1 |
| R28 = Stop | | | |

| Variable Separation | Focal Length | | |
|---|---|---|---|
| | 1.00 | 3.69 | 5.72 |
| D6 | 0.075 | 2.322 | 2.711 |
| D11 | 1.324 | 0.548 | 0.215 |
| D12 | 1.412 | 0.569 | 0.208 |
| D18 | 0.177 | 1.020 | 1.382 |

| Surface No. | Aspheric Coefficient | | |
|---|---|---|---|
| | B | C | D |
| 5 | −0.2913 × 10⁻² | −0.4691 × 10⁻³ | −0.9809 × 10⁻⁵ |
| 14 | 0.3340 × 10⁻¹ | 0.5166 × 10⁻² | 0.1111 × 10⁻¹ |
| 18 | 0.2596 × 10⁻¹ | 0.6554 × 10⁻² | 0.1146 × 10⁻¹ | f1 = 6.630
f2 = −5.80          F1 = 6.03
f3 = 5.23

Though the present invention has been described in connection with the embodiments where each lens system consists of four lens groups of which the first three are moved to effect zooming, the zoom lens of the invention may be in the form of three lens groups, as the fourth lens group is not always necessary.

As in the above, according to the present invention, a zoom lens of a high relative aperture and a large zoom ratio will stabilized for all aberrations can be realized.

What we claim:

1. A zoom lens comprising:
   three lens groups,
   said three lens groups including, from front to rear, a first lens group of positive refractive power, a second lens group of negative refractive power and a third lens group,
   said first lens group consisting of, from front to rear, a bi-convex first lens, a second lens of negative refractive power, and a third lens of positive refractive power, whereby zooming is effected by changing the air separations between the first lens group and the second lens group and between the second lens group and the third lens group of said three lens groups, the three lenses of said first lens group being separated from each other and a first lens surface of said second lens being concave toward the object.

2. A zoom lens according to claim 1, satisfying the following conditions:

$$0.5f3 < f1 < 2f3$$

$$0.8|R2| < R3 < 1.5R2$$

wherein
   F1 is the focal length of said first lens groups;
   f1, and f3 are the focal lengths of said first and said third lenses respectively; and
   Ri is the radius of curvature of the i-th surface counting from front in said first lens group.

3. A zoom lens according to claim 2, wherein said second lens is made of plastic.

4. A zoom lens according to claim 1, wherein said first lens is made of optical glass, and said third lens is made of plastic.

5. A zoom lens according to claim 1, wherein at least one of the lens surfaces in said first lens group is aspherical.

6. A zoom lens comprising:
   a front lens unit of positive power including:
   a first lens convex on both sides, a second negative lens with its first surface concave toward the object, and a third positive lens, the lenses of said front lens unit being separated from each other;
   a middle lens unit of negative power;
   a rear lens unit;
   wherein the zooming is performed by simultaneously changing the axial space between the front lens unit and the middle lens and the axial space between the middle lens unit and the rear lens unit;

and satisfying the following conditions:

$$0.5f3 < f1 < 2f3$$

$$0.8|R2| < |R3| < |1.5|R2|$$

wherein f1 represents the focal length of said first lens, f3 represents the focal length of said third lens, R3 represents the curvature on the image side of the said first lens, and R2 represents the radius of curvature on the object side of said second lens.

7. A zoom lens according to claim 6, in which said second lens and said third lens are made of plastics.

8. A zoom lens according to claim 7, in which one surface of said second lens and said third lens each have one aspherical surface.

9. A zoom lens comprising:
a front lens unit of positive power consisting of a bi-convex first lens, a bi-concave second lens and third lens convex toward the object, the lenses of said front lens unit being separated from each other; a middle lens unit of negative power, and a rear lens unit, wherein zooming is performed by simultaneously changing the axial space between said front lens unit and said middle lens unit and the axial space between said middle lens unit and said rear lens unit, and said first lens is made of optical glass, said second and third lenses are made of plastic, and the radius of curvature on the image side of said second lens is larger than that on the object side of said third lens.

10. A zoom lens according to claim 9, which satisfies the following conditions:

$$0.5f3 < f1 < 2f3$$

$$0.8|R2| < |R3| < 1.5|R2|$$

wherein f1 represents the focal length of said first lens, f3 represents the focal length of said third lens, R2 represents the radius of curvature on the image side of said first lens and R3 represents the radius of curvature on the object side of said second lens.

* * * * *